Figure 1:
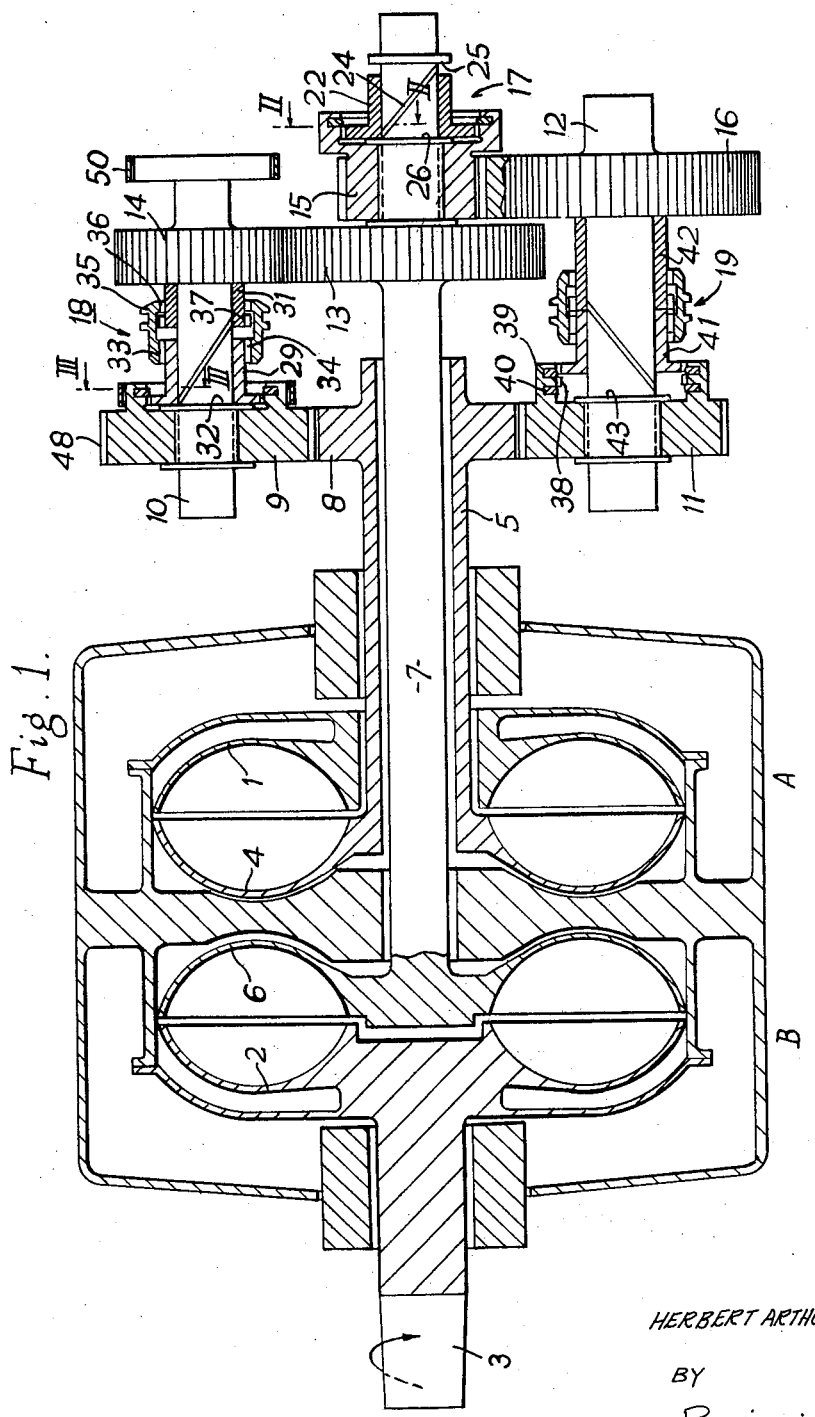

INVENTOR
HERBERT ARTHUR CLEMENTS
BY
Benjamin Sweedler
ATTORNEY

INVENTOR
HERBERT ARTHUR CLEMENTS

BY Benjamin Sweedler
ATTORNEY

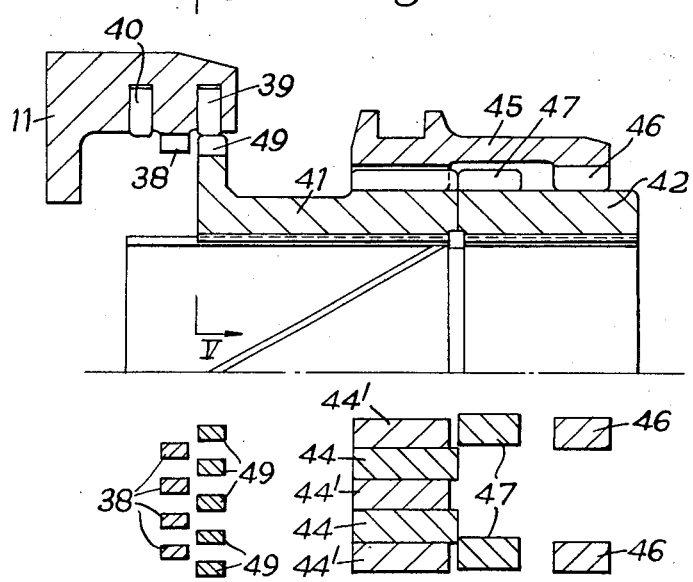

Oct. 8, 1963 H. A. CLEMENTS 3,106,102
POWER TRANSMISSION SYSTEMS INCORPORATING VARIABLE SPEED GEARING
Filed Nov. 7, 1960 4 Sheets-Sheet 4
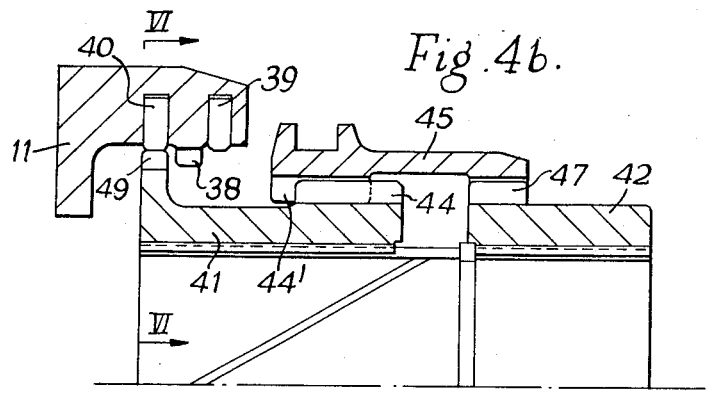
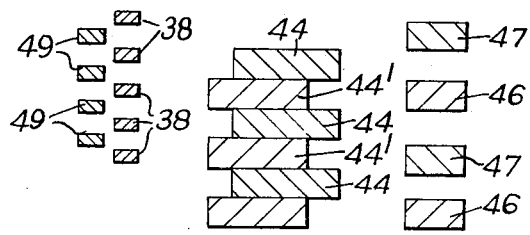
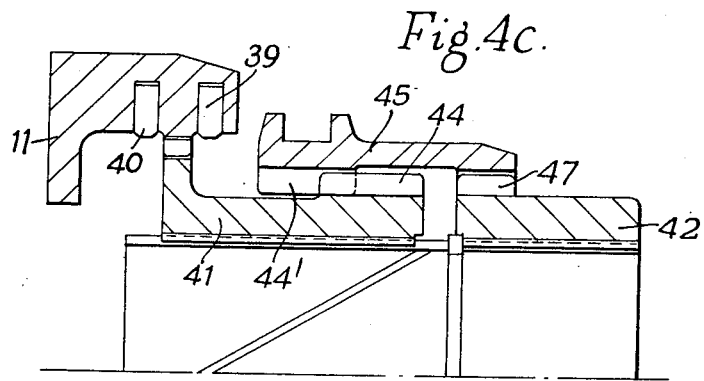
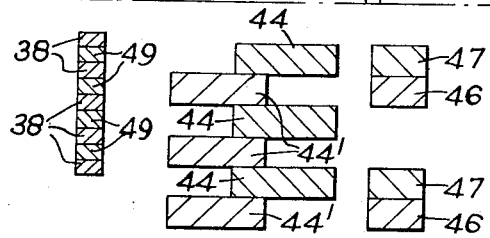
INVENTOR
HERBERT ARTHUR CLEMENTS
BY
Benjamin Sweedler
ATTORNEY

United States Patent Office 3,106,102
Patented Oct. 8, 1963

3,106,102
POWER TRANSMISSION SYSTEMS INCORPORATING VARIABLE SPEED GEARING
Herbert Arthur Clements, Weybridge, England, assignor to S.S.S. Gears Limited, Isleworth, Middlesex, England, a British company
Filed Nov. 7, 1960, Ser. No. 67,619
Claims priority, application Great Britain Nov. 11, 1959
1 Claim. (Cl. 74—359)

This invention relates to power transmission systems of variable speed ratio wherein first and second input shafts are provided and selection clutches are used for setting the system to provide the selected speed ratio, the object of the invention being to provide a variable speed ratio power transmission system wherein four different speed ratios are obtainable, using for example only seven gear wheels and three jaw clutches in association with the said first and second input shafts.

A power transmission system according to the invention comprises selectively drivable first and second input shafts, a layshaft and an output shaft, geared driving connections between said layshaft and each of said input shafts, at least one of said driving connections comprising a gear wheel on the layshaft and a clutch selectively operable to establish or interrupt a driving connection between said gear wheel and the layshaft, and geared driving connections between each of said input shafts and said output shaft, said last mentioned driving connections including respective gear wheel mounted on one of the shafts interconnected by the driving connection, and a clutch selectively operable to establish or interrupt a driving connection between the last mentioned gear wheels and the shafts on which they are mounted.

In a preferred form of the invention the first and second input shafts are coupled to a common prime mover, e.g., an engine, through the intermediary of hydraulic turbo couplings of a type provided with means, e.g., an adjustable scoop tube, for controllably filling and emptying the working circuit, so that either of said input shafts can be selectively driven by said prime mover by filling the working circuit of the associated turbo coupling and emptying the working circuit of the other coupling.

The clutches employed are preferably of a synchronous self-shifting type comprising a first toothed clutch member, a second clutch member and a toothed intermediate member constrained to move helically relative to said second clutch member to bring its teeth into and out of engagement with the teeth of the first clutch member, and means e.g. pawls for initiating toothed engagement of the intermediate member with the first clutch member upon relative movement of said first and second clutch members in one direction. Clutches of this type are employed in the embodiment of the invention now to be described in detail, and as will be described the said second clutch is provided with controllable locking means for locking it in the engaged condition, and the said third clutch is provided with two oppositely directed sets of pawls and with a rotational lock.

Figure 2:
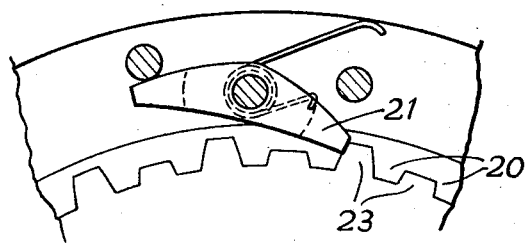
Figure 3:
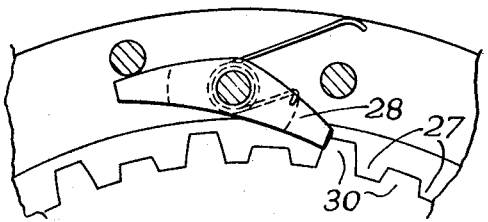
Figure 5:
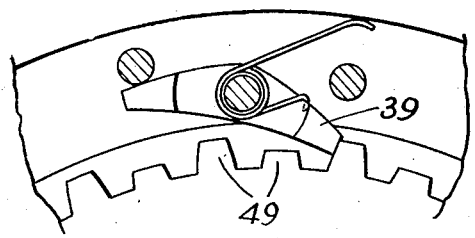
Figure 6:
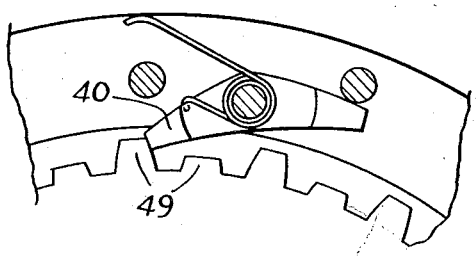

In the accompanying drawings,

FIG. 1 shows diagrammatically a power transmission system according to the invention, incorporating synchronous self-shifting clutches, FIG. 2 is a sectional view of one of the clutches on the line II—II of FIG. 1, FIG. 3 is a sectional view of another of the clutches on the line III—III of FIG. 1, FIGS. 4a–4c are views in longitudinal section, on a larger scale than FIG. 1, of the third clutch, FIG. 5 is a sectional view on the line V—V of FIG. 4a, and FIG. 6 is a sectional view on the line VI—VI of FIG. 4b.

Referring to the drawings, two turbo couplings A and B are arranged coaxially with their vaned impellers 1 and 2 drivably connected to one another and to a common input shaft 3 coupled to the output shaft of an engine (not shown). Each of the turbo couplings is of the variable filling type comprising for example an adjustable scoop tube the setting of which determines the degree of filling of the working circuit of the coupling. The turbo couplings are required to be alternatively filled and emptied and if desired their scoop tubes or other filling control means may be interconnected for uni-control so that when either coupling is filled the other coupling empties. The vaned runner 4 of coupling A is mounted on a sleeve shaft 5, and the vaned runner 6 of coupling B is mounted on a solid shaft 7 which is arranged with clearance within the sleeve shaft 5 and projects therefrom at the end remote from the turbo couplings. When coupling A is full and coupling B is empty the sleeve shaft 5 is driven by the engine; when coupling B is full and coupling A is empty the solid shaft 7 is driven by the engine.

On the sleeve shaft 5 is fixed a gear wheel 8 which meshes with a gear wheel 9 loosely mounted on a layshaft 10 and with a gear wheel 11 loosely mounted on an output shaft 12. A gear wheel 13, which meshes with a gear wheel 14 fixed on the layshaft 10, is fixed on the solid shaft 7, and a gear wheel 15 loosely mounted on the solid shaft 7 meshes with a gear wheel 16 fixed on the output shaft 12. Clutches 17, 18 and 19 are provided for respectively clutching the gear wheel 15 to the solid shaft 7, the gear wheel 9 to the layshaft 10 and the gear wheel 11 to the output shaft 12. The clutches are of the synchronous self-shifting type and in the following description thereof it will be assumed that when the engine is operating it rotates the input shaft 3 in clockwise direction as viewed from the left-hand side in FIG. 1.

The clutch 17 (FIGS. 1 and 2) comprises a first clutch member constituted by the gear wheel 15, which carries internal clutch teeth 20 and pawls 21, and an intermediate member in the form of a clutch sleeve 22 carrying external clutch teeth 23 and formed with internal helical splines engaged with external helical splines 24 on the solid shaft 7, so that the clutch sleeve 22 is movable helically on the shaft 7 between axial stops 25 and 26. The noses of the pawls 21 point in anticlockwise direction; thus, when the clutch sleeve 22 is up against the stop 25, according to the direction of relative rotation of the gear wheel 15 and shaft 7 the pawls 21 will either ratchet over the clutch teeth 23 or will engage them and draw the clutch sleeve 22 into toothed engagement with the clutch teeth 20.

The clutch 18 (FIGS. 1 and 3) comprises a first clutch member constituted by the gear wheel 9, which carries internal clutch teeth 27 and pawls 28, and an intermediate member in the form of a clutch sleeve 29 formed with clutch teeth 30, the clutch sleeve 29 being provided with internal helical splines which engage with external helical splines on the layshaft 10 so that the clutch sleeve 29 is movable helically relative to the shaft 10 between an axial stop formed by a sleeve 31 fixed on shaft 10 and an axial stop 32. The clutch sleeve 29 is formed with external straight splines 33 with which engage internal straight splines 34 in a control sleeve 35, which also has internal dogs 36 which by axial movement of the control sleeve 35 when the clutch is engaged can be caused to engage with or disengage from shaft dogs 37 on the bushing 31 so as to lock the clutch sleeve 29 against rotation relative to the shaft 10 or to free the clutch sleeve 29 to enable it to move helically relative to the shaft 10. The pawls 28 are arranged with their noses pointing in anti-clockwise direction so that when the clutch sleeve 29 is up against bushing 31, the pawls 28 ratchet over the clutch teeth 30 or engage them so as to draw the clutch sleeve 29 into engagement with the clutch teeth 27, according to the direction of relative rotation of the gear wheel 9 and the layshaft 10.

The clutch 19 (FIGS. 1, 4a–4d, 5 and 6) comprises a first clutch member formed by gear wheel 11, which carries clutch teeth 38 and which is provided with two sets of pawls 39 and 40, the noses of the pawls 39 pointing in clockwise direction (FIG. 5) and the noses of the pawls 40 pointing in anti-clockwise direction (FIG. 6). A clutch sleeve 41 with external clutch teeth 49 has internal helical splines engaged with external helical splines on the output shaft 12 so that it is movable helically relative to the shaft 12 between a stop formed by a sleeve 42 fixed on shaft 12 and an axial stop 43. The clutch sleeve 41 is formed with straight splines 44 with which are engaged internal splines 44' in a control sleeve 45 which also has internal dogs 46. The bushing 42 is formed with shaft dogs 47.

The operation is as follows:

In first gear, the working circuit of turbo coupling A is filled and the working circuit of turbo coupling B is empty, so that rotation of the input shaft 3 in the direction indicated by the arrow (clockwise as seen from the left in FIG. 1) causes the sleeve shaft 5 to be driven in clockwise direction. Initially, the control sleeve 35 is in the unlocked position (as shown in FIG. 1) and the anti-clockwise rotation of gear wheel 9 causes pawls 28 to engage clutch teeth 30 and draw the clutch sleeve 29 into engagement with the clutch teeth 28 thereby effecting driving engagement between the gear wheel 9 and the layshaft 10. Accordingly, the gear wheel 14 drives the gear wheel 13 and solid shaft in clockwise direction. If initially clutch 17 is in the disengaged or ratchetting condition in which the clutch sleeve 22 is up against stop 25, the initial rotation of the gear wheel 13 and subsequently of the solid shaft 7 causes pawls 21 to engage clutch teeth 23 and draw the clutch sleeve 22 into engagement with the clutch teeth 20 thereby effecting a driving connection from solid shaft 7 via gear wheel 15 and gear wheel 16 to output shaft 12.

At this stage, clutch 19 has its parts in the positions shown in FIGURE 4a, with the pawls 39 ratchetting with respect to the clutch teeth 38 of the clutch sleeve 41.

In order to change to second speed the working circuit of turbo coupling A is emptied and the working circuit of turbo coupling B is filled, so that the drive is now transmitted from input shaft 3 to the solid shaft 7 and thence via gear wheels 15 and 16 to the output shaft 12.

In order to prepare for a change to third speed while driving in second speed, a brake indicated at 48 is applied to gear wheel 9 thereby causing clutch 18 to disengage, and as the speed of gear wheel 11 is reduced below the speed of the output shaft 12, clutch teeth 38 of the clutch sleeve 41 are engaged by pawls 39 so that the clutch sleeve 41 is moved helically along the shaft 12, its clutch teeth 49 passing through the clutch teeth 38 and into ratchetting engagement with the pawls 40 (FIG. 4b). The control sleeve 45 then moves to bring its dogs 46 into angular alignment with the shaft dogs 47 as shown in FIGURE 4b. The brake 48 is then released.

Following these operations the system is still in the second speed condition and for a change to third speed the working circuit of turbo coupling B is emptied and the working circuit of turbo coupling A is refilled so that the drive is now transmitted from input shaft 3 via sleeve shaft 5 to gear wheels 8 and 11, pawls 40 engaging clutch teeth 49 and moving the clutch sleeve 41, to the right in FIG. 1 to cause its clutch teeth 49 to engage with the clutch teeth 38 as shown in FIGURE 4c, the associated angular movement of the control sleeve 45 bringing its dogs 46 into engagement with the shaft dogs 47 as shown in FIGURE 4c, so that movement of the clutch sleeve 41 beyond the position of toothed engagement is prevented by the rotational lock formed by the dogs 46 and 47.

To prepare for a change to fourth speed whilst driving into third speed, a brake 50 is applied to the layshaft 10 to slow down the output shaft of the turbo coupling B, causing clutch 17 to disengage and causing clutch 18 to move into engagement, its control sleeve 35 being then moved into the locking position whereupon the brake 50 is released. For the change to fourth speed the working circuit of turbo coupling A is emptied and the working circuit of turbo coupling B is refilled and the drive is now transmitted from the input shaft 3 and solid shaft 7 through gear wheels 13 and 14 to the layshaft 10, clutch 18, gear wheels 9 and 8 and clutch 19 to the output shaft 12.

In order to change from a higher to a lower speed ratio the above-described sequences are reversed, the required settings of the clutches being established prior to the actual speed change being effected by changing the degree of filling of the working circuits of the turbo couplings.

The control sleeve 35 on clutch 18 and the control sleeve 45 on clutch 19 are provided respectively with a groove and actuating fork mechanism (not shown) of conventional form whereby the said control sleeves can be moved (preferably through a spring link or equivalent elastic means), into and out of the desired settings to select the engagement or disengagement of the said respective clutches.

I claim:

A variable speed transmission system comprising a first input shaft, a second input shaft, a layshaft and an output shaft, a first gear train for drivably interconnecting said layshaft and said first input shaft, a second gear train for drivably interconnecting said layshaft and said second input shaft, at least one of said gear trains including a gear wheel carried on said layshaft and a clutch selectively operable to connect and disconnect said gear wheel to and from said layshaft, a third gear train for drivably interconnecting said first input shaft and said output shaft, said third gear train including a gear wheel carried by one of said first input and said output shafts, and a clutch selectively operable to connect and disconnect said last-mentioned gear wheel to and from the shaft by which it is carried, a fourth gear train for drivably interconnecting said second input shaft and said output shaft, said fourth gear train including a gear wheel carried by one of said second input and said output shafts, and a clutch selectively operable to connect and disconnect said last-mentioned gear wheel to and from the shaft by which it is carried.

References Cited in the file of this patent

UNITED STATES PATENTS

| 2,055,895 | Fawcett | Sept. 29, 1936 |
| 2,599,801 | Youngren et al. | June 10, 1952 |

FOREIGN PATENTS

| 135,736 | Australia | Dec. 19, 1949 |